(12) United States Patent
Isozaki

(10) Patent No.: US 6,733,580 B2
(45) Date of Patent: May 11, 2004

(54) INORGANIC FILM-FORMING COATING COMPOSITION, PREPARATION METHOD THEREOF AND INORGANIC FILM-FORMING METHOD

(75) Inventor: Osamu Isozaki, Kanagawa-ken (JP)

(73) Assignee: Kansei Paint Co., LTD, Hyogo-Ken (JP)

( * ) Notice: Subject to any disclaimer, the term of this patent is extended or adjusted under 35 U.S.C. 154(b) by 0 days.

(21) Appl. No.: 10/408,549

(22) Filed: Apr. 8, 2003

(65) Prior Publication Data
US 2003/0205169 A1 Nov. 6, 2003

Related U.S. Application Data

(63) Continuation-in-part of application No. 09/589,343, filed on Jun. 8, 2000, now Pat. No. 6,565,641.

(30) Foreign Application Priority Data

Jun. 8, 1999 (JP) .......................................... 11-161096

(51) Int. Cl.$^7$ ....................... C01G 23/04; C01G 23/053
(52) U.S. Cl. ................................................ 106/287.19
(58) Field of Search ..................... 106/287.19

(56) References Cited

U.S. PATENT DOCUMENTS

| 5,403,513 A | 4/1995 | Sato et al. |
| 5,650,126 A | 7/1997 | Taoda et al. |
| 6,565,641 B1 * | 5/2003 | Isozaki ................. 106/287.19 |

FOREIGN PATENT DOCUMENTS

| EP | 0897957 | 2/1999 |
| EP | 0992456 | 4/2000 |
| JP | 252301/87 | * 11/1987 |
| JP | 71418/97 | 3/1997 |

OTHER PUBLICATIONS

Abstract of WPI Accession No. 99–283726, JP 11092689 1999, no month provided.
Abstract of WPI Accession No. 98–537684, JP 10237353 1998, no month provided.
Abstract of WPI Accession No. 97–475382, JP 9221234 1997, no month provided.
Abstract of WPI Accession No. 97–231057, JP 9071418 1997, no month provided.
Abstract of WPI Accession No. 96–007046, JP 7286114 1996, no month provided.
Abstract of WPI Accession No. 91–210614, JP 3131520 1991, no month provided.
Abstract of WPI Accession No. 88–081697, JP 63035419 1988, no month provided.
Abstract of WPI Accession No. 87–350775, JP 62252319 1987, no month provided.
Abstract of WPI Accession No. 87–350760, JP 62252301 1987, no month provided.
Abstract of WPI Accession No. 88–254362, JP–63185820 1988, no month provided.

* cited by examiner

Primary Examiner—David Brunsman
(74) Attorney, Agent, or Firm—Fisher, Christen & Sabol

(57) ABSTRACT

A method for preparing an inorganic film-forming coating composition. The method involves reacting a titanium monomer and/or a low condensation product thereof containing a group hydrolyzed to form a hydroxyl group with a hydrogen peroxide water.

3 Claims, No Drawings

INORGANIC FILM-FORMING COATING COMPOSITION, PREPARATION METHOD THEREOF AND INORGANIC FILM-FORMING METHOD

This application is a continuation-in-part of U.S. Ser. No. 09/589,343, filed on Jun. 8, 2000 now U.S. Pat. No. 6,565,641, that has priority benefit of Japanese Patent Application No. 99/161096, filed on Jun. 8, 1999.

BACKGROUND OF THE INVENTION

1. Field of the Invention

The present invention relates to a coating composition capable of forming a titanium oxide film showing good properties in photoactivity, antibacterial properties, hydrophilic properties, pollution resistance, hazeproofness, gas decomposition properties, deodorizing properties, water treatment properties, energy transformation properties, decoloring properties, etc., a method of preparing the coating composition, and a method of forming the inorganic film.

2. Background Art

The titanium oxide film-forming methods known in the art may include, for example, (1) a method of coating a titanium oxide sol onto a substrate, followed by sintering, (2) a method of coating an aqueous solution of titanium chloride or titanium sulfate onto a substrate, followed by heat treating, (3) a plasma spray coating method which comprises fusing titanium oxide solid particles in the presence of plasma generated in atmosphere, followed by spraying onto a substrate, (4) a spatter spraying method of spattering the oxide as a target under vacuum, followed by spraying onto a substrate, (5) a chemical vapor deposition method of volatilizing an organic metal compound or the like, followed by decomposing in an electric furnace, and forming a film onto a substrate, (6) a sol-gel method of coating a sol obtained by hydrolysis of a metal alkoxide onto a substrate, followed by sintering, and the like.

However, the above methods (1) to (6) have such drawbacks that the method (1) is such that a film thickness of 0.1 $\mu$m or more may develop cracks and peelings, resulting in showing poor film-forming properties, and sintering at a temperature of hundreds is required, resulting in requiring much time and labor, the method (2) is such that adverse effects of thermal decomposition products on the substrate and necessity of sintering at a temperature of hundreds require much time and labor, the method (3) is unable to form a fine film and results in poor adhesion properties, the methods (4) and (5) are such that a satisfactory film may be obtained under vacuum, so that a vacuumizing reactor may be required, and that a film-forming speed may be so low that it may require heating the substrate at a temperature of hundreds to obtain a fine film, and the method (6) is such that the acid, alkali and organic compounds contained in the sol of the method (6) may produce problems of corrosion of a substrate, and that removal of the organic compounds requires heating at 400° C. or higher.

In addition to the above methods, the methods free of the step of sintering at high temperatures may include (7) a method of forming a titanium oxide film from an aqueous fluoride solution of titanium oxide and boric acid, (8) a method which comprises precipitating a titanium hydroxide gel from an aqueous solution of titanium chloride or titanium sulfate and an alkali solution such as ammonia, caustic soda and the like, followed by separating the titanium hydroxide gel by decantation, thoroughly washing with water, and adding hydrogen peroxide water (see Japanese Patent Application Laid-Open No. 71418/97), and the like.

However, the method (7) has the drawbacks that formation of the film requires much time, and handling of the fluoride is troublesome, and the method (8) has the drawbacks that the method (8) comprises complicated steps, removal of the alkali salt is troublesome, inclusion of other metals may make it difficult to obtain a high purity film, and difficulty in control of pH results in films different from each other depending on variation of pH, and so forth.

BROAD DESCRIPTION OF THE INVENTION

It is an object of the present invention to provide a coating composition suitable for use in forming an inorganic film, and free of byproducts such as alkali salt, fluoride and the like as in the prior art so as to show good properties in storage stability, film performances, etc.

It is another object of the present invention to provide a coating composition for use in forming an inorganic film, particularly a titanium oxide film, a preparation method of the coating composition and a method of forming an inorganic film, particularly a titanium oxide film, so that the titanium oxide film may be formed at such a low temperature that the resulting titanium oxide film may show characteristic film performances such as photoactivity, antibacterial properties, hydrophilic properties, pollution resistance, hazeproofness, gas decomposition properties, deodorizing properties, water treatment, energy transformation, decoloring properties and the like.

That is, the present invention provides an inorganic film-forming coating composition prepared by reacting a titanium monomer and/or a low condensation product thereof containing a group hydrolyzed to form hydroxyl group with a hydrogen peroxide water, a heat modified, inorganic film-forming coating composition prepared by heat treating at 80° to 100° C. or autoclaving at 80° to 200° C. the inorganic film-forming coating composition to form titanium oxide fine particles, a method of preparing the inorganic film-forming coating composition, which method comprises adding the titanium monomer and/or the low condensation product thereof containing the group hydrolyzed to form hydroxyl group into the hydrogen peroxide water for reacting preferably at a temperature in the range of 10° to 70° C., a method of forming an inorganic film, which method comprises coating the inorganic film-forming coating composition or the heat-modified inorganic film-forming coating composition onto the substrate, or impregnating the substrate with the coating composition, followed by drying or heat treating to form an inorganic film preferably showing good properties in photoactivity, antibacterial properties, hydrophilic properties, pollution resistance, hazeproofness, gas decomposition properties, deodorizing properties, water treatment properties, energy transformation properties and decoloring properties.

The present invention preferably relates to a method of preparing the inorganic film-forming coating composition. The invention method comprises adding a titanium monomer and/or a low condensation product thereof containing the group hydrolyzed to form hydroxyl group into a mixture of hydrogen peroxide water with water in such an amount that the titanium monomer and/or the low condensation product thereof may be hydrolyzed, followed by reacting to form a hydroxyl group-containing titanium compound, and immediately following such reaction with coordination of the hyroxyl group-containing titanium compound with hydrogen peroxide to form a chelate solution. An inorganic film-forming coating composition comprising the chelate solution is obtained. The titanium monomer containing the group hydrolyzed to form hydroxyl group is represented by the formula Ti(OR)$_4$, wherein R is the same or different, and represents an alkyl group having 1 to 5 carbon atoms. The low condensation product has a degree of condensation of 2 to 30. A mixing ratio of the titanium monomer and/or the low condensation product thereof containing the group hydrolyzed to form hydroxyl group to the hydrogen peroxide water is such that the hydrogen peroxide water is in the range of 0.1 to 100 parts by weight as hydrogen peroxide per 10 parts by weight of the titanium monomer and/or the low condensation product thereof. The reaction temperature is in the range of 10° to 70° C.

The present invention preferably also relates to a method of forming an inorganic film. The invention method comprises coating an inorganic film-forming coating composition onto a substrate or impregnating the substrate with the coating composition, followed by drying or heat treating to form an inorganic film. The inorganic film-forming coating composition is prepared by a preparation method. The preparation method comprises adding titanium monomer and/or a low condensation product thereof containing the group hydrolyzed to form hydroxyl group into a mixture of a hydrogen peroxide water with water in such an amount that the titanium monomer and/or the low condensation product thereof may be hydrolyzed, followed by reacting to form a hydroxyl group-containing titanium compound, and immediately following such reaction with coordination of the hydroxyl group-containing titanium compound with hydrogen peroxide to form a chelate solution. The inorganic film-forming coating composition comprising the chelate solution is obtained. The titanium monomer containing the group hydrolyzed to form hydroxyl group is represented by the formula Ti(OR)$_4$, wherein R is the same or different, and represents an alkyl group having 1 to 5 carbon atoms. The low condensation product has a degree of condensation of 2 to 30. A mixing ratio of the titanium monomer and/or the low condensation product thereof containing the group hydrolyzed to form hydroxyl group to the hydrogen peroxide water is such that the hydrogen peroxide water is in the range of 0.1 to 100 parts by weight as hydrogen peroxide per 10 parts by weight of the titanium monomer and/or the low condensation product thereof. The reaction temperature is in the range of 10° to 70° C.

The present invention preferably further relates to an inorganic film prepared according to a method. The invention method comprises coating an inorganic film-forming coating composition onto a substrate or impregnating the substrate with the coating composition, followed by drying or heat treating to form an inorganic film. The inorganic film-forming coating composition is prepared by a preparation method. The preparation method comprises adding titanium monomer and/or a low condensation product thereof containing the group hydrolyzed to form hydroxyl group into a mixture of a hydrogen peroxide water with water in such an amount that the titanium monomer and/or the low condensation product thereof may be hydrolyzed, followed by reacting to form a hydroxyl group-containing titanium compound, and immediately following such reaction with coordination of the hydroxyl group-containing titanium compound with hydrogen peroxide to form a chelate solution The inorganic film-forming coating composition comprising the chelate solution is obtained. The titanium monomer containing the group hydrolyzed to form hydroxyl group is represented by the formula Ti(OR)$_4$, wherein R is the same or different, and represents an alkyl group having 1 to 5 carbon atoms, and shows (has) photoactivity, antibacterial properties, hydrophilic properties, pollution resistance, hazeproofness, gas decomposition properties, deodorizing properties, water treatment properties, energy transformation properties, decoloring properties and corrosion resistance.

In the method of preparing the inorganic film-forming coating composition, addition of the mixture of hydrogen peroxide with water into the titanium monomer and/or the low condensation product thereof may undesirably result in obtaining an inorganic film-forming coating composition gelling in a short period of time so as to be unstable at room temperature and showing (having) poor storage stability.

In the method of preparing the inorganic film-forming coating composition, the use of the hydrogen peroxide water in place of the mixture of the hydrogen peroxide water with water may undesirably result in obtaining an inorganic film-forming coating composition gelling in a very short period of time so as to be unstable at room temperature and showing (having) poor storage stability.

DETAILED DESCRIPTION OF THE INVENTION

The inorganic film-forming coating composition in the present invention is obtained by reacting a titanium monomer and/or a low condensation product thereof containing a group hydrolyzed to form hydroxyl group with a hydrogen peroxide water.

The titanium monomer containing the group hydrolyzed to form hydroxyl group may preferably include tetraalkoxytitanium represented by the general formula: Ti(OR)$_4$, wherein R is the same or different, and represents an alkyl group having 1 to 5 carbon atoms. Examples of the alkyl group may include methyl group, ethyl group, n-propyl group, isopropyl group, n-butyl group, isobutyl group, sec-butyl group, tert-butyl group, and the like.

The low condensation product of the titanium monomer containing the group hydrolyzed to form hydroxyl group may preferably include compounds obtained by subjecting the titanium monomer represented by the above general formula: Ti(OR)$_4$ to condensation reaction and having a degree of condensation of 2 to 30, particularly 2 to 10.

A mixing ratio of the titanium monomer and/or the low condensation product thereof (hereinafter may be referred to as a hydrolyzable titanium compound) containing the group hydrolyzed to form hydroxyl group to the hydrogen peroxide water is in the range of 0.1 to 100 parts by weight, particularly 1 to 20 parts by weight as hydrogen peroxide per 10 parts by weight, of the hydrolyzable titanium compound. An amount less than 0.1 part by weight of the hydrogen peroxide results in incomplete formation of a chelate compound, resulting in developing hazes and precipitates. On the other hand, when more than 100 parts by weight of the hydrogen peroxide is used, unreacted hydrogen peroxide may remain so that a dangerous active oxygen may be discharged during storage.

A hydrogen peroxide content in the hydrogen peroxide water may not particularly be limited, but preferably is in the range of 3 to 30% by weight from the standpoints of easiness of handling and a solid content of the resulting solution as regards coating workability.

The inorganic film-forming coating composition in the present invention may be prepared by reacting the hydrolyzable titanium compound with the hydrogen peroxide water at a reaction temperature in the range of 10° to 70° C. for 10 minutes to 20 hours.

The inorganic film-forming coating composition in the present invention may be obtained in such a manner that the reaction of the hydrolyzable titanium compound with the hydrogen peroxide water results in hydrolysis of the hydrolyzable titanium compound to form a hydroxyl group-containing titanium compound, followed by coordinating the hydroxyl group-containing titanium compound with hydrogen peroxide, wherein the hydrolysis reaction and the coordination may almost simultaneously take place, to form a chelate solution showing high stability at room temperature and a long term storage stability. On the other hand, a titanium hydroxide gel used in the preparation of the titanium oxide film in the art is partly three dimensionalized through a Ti—O—Ti linkage, and is essentially different from the above reaction product of the hydroxyl group-containing titanium compound with the hydrogen peroxide water in composition and stability.

The inorganic film-forming coating composition in the present invention may be heat treated at 80° to 100° C., or autoclaved at 800 to 200° C. to obtain a titanium oxide dispersion containing ultrafine particles of crystallized titanium oxide. When lower than 80° C., crystallization of titanium oxide may not satisfactorily proceed. The above titanium oxide dispersion may also be used as a titanium oxide film-forming solution.

The inorganic film-forming coating composition in the present invention may be coated onto a substrate, followed by drying or heat treating at a low temperature to form a fine titanium oxide film showing good adhesion properties. A titanium oxide film may be formed at a low temperature, but a heat treating temperature of 200° to 500° C., preferably 200° to 350° C., is preferable for the purpose of improving adhesion properties. One coating makes it possible to form a titanium oxide film having a thickness of 1 μm or more, and showing good adhesion properties without being separated, but the film thickness is usually in the range of 0.001 to 10 μm, particularly 0.1 to 1 μm.

The inorganic film-forming coating composition in the present invention is such that a heat treatment at a temperature lower than 200° C. forms a non-crystalline titanium oxide film containing some hydroxyl group, whereas when 200° C. or higher, a fine crystalline titanium oxide film is formed.

Coating only of the titanium oxide dispersion obtained by the heat treatment at 80° to 100° C. makes it possible to form a crystalline titanium oxide film so as to be useful as a coating composition for use in a substrate incapable of heat treating, resulting in being applicable to various uses as above described and in making it possible to form a film having a relatively high density and showing good adhesion properties at low temperatures.

The above film prepared by drying only may show water resistance and impregnating properties so as to be impregnated with a solution of other compounds, resulting in that the following heat treatment makes it possible to form such a composite material that the other compound may be deposited or dispersed into the titanium oxide film. The other compound may include, for example, other metal compounds.

Other pigments and sols may be added and dispersed into the inorganic film-forming coating composition. Other pigments and sols to be added may include, for example, known titanium oxide sols, titanium oxide powder, etc.

The substrate used in the present invention may include any materials resistant to heat treatment depending on uses, for example, metal, pottery, plastics, fiber, glass, concrete and the like, and may also include the interior surface of a porous material, the surface of a powder to be treated.

Many titanium oxide films obtained in the present invention may show activity on photoirradiation. For example, photooxidation of nitrogen oxide, etc., may result in nitric acid.

The titanium oxide film obtained in the present invention shows, in addition to photoactivity, good properties in heat resistance, corrosion resistance, and may be used as a heat resistant and corrosion resistant film.

Taking advantage of photoactivity of the titanium oxide film, the film may be applicable to various fields such as decomposition and removal of environmental pollutants in air and water, hydrophilizing treatment, antibacterial treatment, deodorizing treatment, hazeproof treatment, water treatment, energy transformation and the like.

The inorganic film-forming coating composition of the present invention is a high purity chelate solution free of byproducts such as an alkali salt, fluoride and the like as in the prior art, and shows good storage stability and is capable of forming a titanium oxide film showing good film performances.

The present invention can provide an improved preparation method of the above coating composition without including complicated steps such as a step of treating byproducts and the like as in the prior art.

The titanium oxide film formed from the above chelate solution may easily be formed at low temperatures and may show characteristic properties of the film itself, resulting in being applicable to the fields such as corrosion resistant fields, fields taking advantage of photocatalytic activity, and the like.

EXAMPLE

The present invention is explained in more detail by the following Examples and Comparative Examples, in which "part" and "%" mean "part by weight" and "% by weight", respectively, and should not be limited to the Examples.

Preparation Example 1

A mixture of 10 parts of tetra-isopropoxytitanium and 10 parts of isopropanol was dropped into a mixture of 10 parts of 30% hydrogen peroxide water and 100 parts of deionized water at 20° C. with agitation over one hour, followed by aging for 2 hours at 25° C. to obtain a yellow, transparent, slightly viscous, inorganic film-forming coating composition, that showed no changes in viscosity for 6 months or longer.

Preparation Example 2

Preparation Example 1 was duplicated except that tetra-n-butoxytitanium was used in place of tetra-isopropoxytitanium to obtain a yellow, transparent, slightly viscous, inorganic film-forming coating composition, that showed no changes in viscosity for 6 months or longer.

Preparation Example 3

Preparation Example 1 was duplicated except that a trimer of tetra-isopropoxytitanium was used in place of tetra-isopropoxytitanium to obtain a yellow, transparent, slightly viscous, inorganic film-forming coating composition that showed no changes in viscosity for 6 months or longer.

Preparation Example 4

Preparation Example 1 was duplicated except that a three fold amount of the hydrogen peroxide water was used, with dropping at 50° C. over one hour, and aging at 60° C. for 3 hours to obtain a yellow, transparent, slightly viscous, inorganic film-forming coating composition, that showed no changes in viscosity for 6 months or longer.

Preparation Example 5 (Comparative)

A mixture of 10 parts of 30% hydrogen peroxide water and 100 parts of deionized water was dropped into a mixture of 10 parts of tetra-isopropoxytitanium and 10 parts of isopropanol at 20° C. with agitation over one hour, followed by aging for 2 hours at 25° C. to obtain an inorganic film-forming coating composition, that showed a very high viscosity and gelled in one month.

Preparation Example 6 (Comparative)

Into a mixture of 10 parts of tetra-isopropoxytitanium and 10 parts of isopropanol was dropped into 10 parts of 30% hydrogen peroxide water at 20° C. with agitation over one hour to obtain an inorganic film-forming coating composition, that showed a very high viscosity and gelled in one week.

Preparation Example 7 (Comparative)

A mixture of 10 parts of tetra-isopropoxytitanium and 10 parts of isopropanol was dropped into 10 parts of 30% hydrogen peroxide water at 20° C. with agitation over one hour to obtain an inorganic film-forming coating composition, that showed a very high viscosity and gelled in two weeks.

Preparation Example 8 (Comparative)

Example 1 of Japanese Patent Application Laid-Open No. 252301/87 (JP62252301) was duplicated to obtain an inorganic film-forming coating composition as follows:

A beaker was charged with 0.522 gram of titanium tetra-isopropoxide, followed by adding thereonto 5 ml of a 30% high purity hydrogen peroxide water, while dipping the beaker into ice water for cooling, slowly stirring to obtain a uniform orange colored aqueous solution of titanium isopropoxide hydrogen peroxide, i.e., an inorganic film-forming coating composition, that showed a high viscosity and gelled in one month.

Examples 1 to 4 and Comparative Examples 1 to 4

The inorganic film-forming coating compositions of Preparation Examples 1 to 8 were coated onto a mild steel sheet so as to be a dry film thickness of 0.3 µm by a bar coater, followed by heat curing at 200° C. for 30 minutes to prepare coating test panels, respectively.

The above coating compositions were subjected to the storage stability test, and the coating test panels were subjected to film appearance, adhesion properties, pencil hardness, water resistance, and wettability or contact angle to water tests, respectively. The results are shown in Table 1:

TABLE 1

|  | Preparation Examples | Storage stability | Film appearance | Adhesion properties | Pencil hardness | Water resistance | Contact angle by water |
| --- | --- | --- | --- | --- | --- | --- | --- |
| Example 1 | 1 | No changes | Good | 100 | 3H | Nothing changed (good) | 10° or less |
| Example 2 | 2 | No changes | Good | 100 | 3H | Nothing changed (good) | 10° or less |
| Example 3 | 3 | No changes | Good | 100 | 3H | Nothing changed (good) | 10° or less |
| Example 4 | 4 | No changes | Good | 100 | 3H | Nothing changed (good) | 10° or less |
| Comparative Example 1 | 5 | Thickening | Good | 100 | 2H | Nothing changed (good) | 10° or less |
| Comparative Example 2 | 6 | Gelation | Cracks developed | 100 | 3H | Local rust developed | 20° or less |
| Comparative Example 3 | 7 | Thickening | Good | 100 | 3H | Nothing changed | 10° or less |
| Comparative Example 4 | 8 | Settling developed | Slightly hazy | 100 | 2H | Slight local rust | 50° or less |

Test Methods

Storage Stability:
Examination was made on changes in viscosity, settling properties, etc., after storage under the conditions of 100 hours at 50° C. in comparison with the initial condition.

Film Appearance:
Film appearance, for example, smoothness, transparency, film-forming properties such as development of crack, etc., was examined.

Adhesion Properties:
In accordance with JIS K-5400 8.5.2. (1990) Square-Tape Adhesion Properties Test Method, 100 squares of 1 mm×1 mm were made, followed by adhering an adhesive cellophane tape onto the squares, and peeling the tape to examine the number of squares remaining without being peeled off.

Pencil Hardness:

A pencil scratching test in accordance with JIS K-5400 8.4.2. (1990) was carried out, and evaluation was made based on the resulting marks.

Water Resistance:

A test panel was dipped into water at 20° C. for 7 days, followed by visually evaluating the film appearance.

Wettability or Contact Angle to Water:

The contact angle by water on the surface of the coating film was measured. An irradiation from a 4 KW high pressure mercury lamp was made at a distance of 30 cm from the surface of the coating film for 10 minutes, followed by measuring the contact angle by water. The contact angle by water was measured in such a manner that a deionized water drop of 0.03 ml was formed on the test panel at 20° C., followed by measuring the contact angle by water by use of a DCCA type Contactangle meter marketed by Kyowa Chemical Co., Ltd.

Example 5 and Comparative Example 5

The inorganic film-forming coating composition of Preparation Example 2 and the dispersion of Preparation Example 5 were each coated onto a mild steel sheet by a bar coater so as to have a dry film thickness of 0.3 µm, followed by heat curing at 200° C. for 30 minutes to obtain a coating test panel, respectively. On the other hand, a closed testing room equipped with a 4 KW high pressure mercury lamp was filled with acetoaldehyde. Each coating test panel was placed at a distance of about 30 cm from the mercury lamp, followed by measuring the decreased acetoaldehyde amount 3 hours after being in and 5 hours after being in the testing room to show gas decomposition properties. An initial acetoaldehyde amount in the testing room was 0.1 g. The results are shown in Table 2:

TABLE 2

|  | Preparation Examples | 3 hours after | 5 hours after |
| --- | --- | --- | --- |
| Example 5 | 2 | 100 ppm (good) | 200 ppm (good) |
| Comparative Example 5 | 5 | 55 ppm (poor) | 72 ppm (poor) |

Example 6 and Comparative Example 6

The inorganic film-forming coating composition of Preparation Example 3 and the viscous liquid of Preparation Example 5 were each coated onto a mild steel sheet by a bar coater so as to have a dry film thickness of 1 µm, followed by heat curing at 150° C. for 30 minutes to obtain a coating test panel, respectively. The coating test panels were subjected to corrosion resistance test so as to be dipped into a 1% salt solution at room temperature for 100 hours, and were subjected to the adhesion properties test using the same test method as above described. The results are shown in Table 3:

TABLE 3

|  | Preparation Examples | Corrosion resistance | Adhesion properties |
| --- | --- | --- | --- |
| Example 6 | 3 | No rust developed (good) | 100 (good) |
| Comparative Example 6 | 5 | Local rust developed (slightly poor) | 100 (good) |

Example 7 and Comparative Example 7

The inorganic film-forming coating composition of Preparation Example 3 and the dispersion of Preparation Example 5 and the dispersion of Preparation Example 5 were each coated onto a mild steel sheet by a bar coater so as to have a dry film thickness of 1 µm, followed by heat curing at 200° C. for 30 minutes to obtain a coating test pane3, respectively. A 30% methylene blue solution was coated onto the coating test panels, followed by drying, irradiating from a 4 KW high pressure mercury lamp at a distance of 30 cm for 5 hours, and visually examining the coloring properties of the coating film to show pollution resistance. The results are show in Table 4:

TABLE 4

|  | Preparation Examples | Coloring properties |
| --- | --- | --- |
| Example 7 | 3 | Scarcely colored (good) |
| Comparative Example 7 | 5 | Colored (slightly poor) |

Preparation Example 9

The inorganic film-forming coating composition of Preparation Example 2 was heat treated at 95° C. for 6 hours to obtain a white-yellow translucent titanium oxide dispersion, i.e., an inorganic film-forming coating composition.

Preparation Example 10 (Comparative)

A dilute ammonia water prepared by diluting with 9 times amount of water (1:9) was dropped in such an amount as to be equivalent or more to neutralize the chlorine contained in titanium tetrachloride into a solution prepared by diluting 5 ml of 60% titanium tetrachloride solution with 500 ml of distilled water to precipitate titanium hydroxide, followed by washing with distilled water to precipitate titanium hydroxide, followed by washing with distilled water, and adding 10 ml of 30% hydrogen peroxide water with agitation to obtain 70 ml of a yellow translucent viscous liquid.

Preparation Example 11 (Comparative)

Titanium hydroxide was dispersed into water to obtain a dispersion of 0.2 mol/L.

Example 8 and Comparative Examples 8 and 9

The inorganic film-forming coating compositions of Preparation Example 9, the viscous liquid of Preparation Example 10 and the dispersion of Preparation Example 11 were each coated onto a mild steel sheet so as to be a dry film thickness of 0.3 μm by a bar coater, followed by heat curing at 200° C. for 30 minutes to prepare coating test panels, respectively.

The above coating compositions were subjected to the storage stability test, and the coating test panels were subjected to film appearance, adhesion properties, pencil hardness, water resistance, and wettability or contact angle by water test, respectively. The results are shown in Table 5:

TABLE 5

| Preparation Examples | Storage stability | Film appearance | Adhesion properties | Pencil hardness | Water resistance | Contact angle by water |
|---|---|---|---|---|---|---|
| Example 8 | 9 | No changes | Hazy | 100 | 2H | Slight local rust | 10° or less |
| Comparative Example 8 | 10 | Slight thickening | Slightly hazy | 100 | 2H | Slight local rust | 10° or less |
| Comparative Example 9 | 11 | Settling developed | Cracks developed | 70 (poor) | 3B or softer | Film disappeared (poor) | 50° or less |

Example 9 and Comparative Example 10

The inorganic film-forming coating composition of Preparation Example 2 and the dispersion of Preparation Example 11 were coated onto a mild steel sheet by a bar coater so as to be a dry film thickness of 0.3 μm, followed by heat curing at 200° C. for 30 minutes to obtain a coating test panel, respectively. On the other hand, a closed testing room equipped with a 4 KW high pressure mercury lamp was filled with acetoaldehyde. The coating test panel was placed at a distance of about 30 cm from the mercury lamp, followed by measuring an acetoaldehyde amount decreased 3 hours after and 5 hours after in the testing room to show gas decomposition properties. An initial acetoaldehyde amount in the testing room was 0.1 g. The results are shown in Table 6:

TABLE 6

| | Preparation Examples | 3 hours after | 5 hours after |
|---|---|---|---|
| Example 9 | 2 | 100 ppm (good) | 200 ppm (good) |
| Comparative Example 10 | 11 | 20 ppm (poor) | 35 ppm (poor) |

Example 10 and Comparative Example 11

The inorganic film-forming coating composition of Preparation Example 3 and the viscous liquid of Preparation Example 9 were coated onto a mild steel sheet by a bar coater so as to be a dry film thickness of 1 μm, followed by heat curing at 150° C. for 30 minutes to obtain a coating test panel, respectively. The coating test panels were subjected to a corrosion resistance test so as to be dipped into a 1% salt solution at room temperature for 100 hours, and were subjected to adhesion properties test in the same test method as above described. The results are shown in Table 7:

TABLE 7

| | Preparation Examples | Corrosion resistance | Adhesion properties |
|---|---|---|---|
| Example 10 | 3 | No rust developed (good) | 100 (good) |
| Comparative | 9 | Local rust developed | 95 (poor) |

TABLE 7-continued

| | Preparation Examples | Corrosion resistance | Adhesion properties |
|---|---|---|---|
| Example 11 | | (poor) | |

Example 11 and Comparative Example 12

The inorganic film-forming coating composition of Preparation Example 3 and the dispersion of Preparation Example 11 were coated onto a mild steel sheet by a bar coater so as to be a dry film thickness of 1 μm, followed by heat curing at 200° C. for 30 minutes to obtain a coating test panel, respectively. A 30% methylene blue solution was coated onto the coating test panels, followed by drying, irradiating from a 4 KW high pressure mercury lamp at a distance of 30 cm for 5 hours, and visually examining coloring properties of the coating film to show pollution resistance. The results are shown in Table 8:

TABLE 8

| | Preparation Examples | Coloring properties |
|---|---|---|
| Example 11 | 3 | Scarcely colored (good) |
| Comparative Example 12 | 11 | Colored nearly as in the initial state (poor) |

What is claimed is:

1. A method of preparing the inorganic-forming coating composition, said method comprising adding a titanium monomer and/or a low condensation product thereof containing a group hydrolyzed to form hydroxyl group into a mixture of hydrogen peroxide water with water in such an amount that the titanium monomer and/or the low condensation product thereof may be hydrolyzed, followed by aging and reacting to form a hydroxyl group-containing titanium compound and immediately followed by coordinating the hydroxyl group-containing titanium compound with hydrogen peroxide to form a chelate solution, and obtaining an inorganic film-forming coating composition comprising the chelate solution, the titanium monomer containing the group hydrolyzed to form hydroxyl group being represented to formula Ti(OR)$_4$, wherein R is same or different, and represents an alkyl group having 1 to 5 carbon atoms, the low condensation product having a degree of condensation of 2 to 30, a mixing ratio of the titanium monomer and/or the low condensation product thereof containing the group hydrolyzed to form hydroxyl group to the hydrogen peroxide water being such that the hydrogen peroxide water is in the range of 1 to 20 parts by weight as hydrogen peroxide per 10 parts by weight of the titanium monomer and/or the low condensation product thereof, the reaction temperature being in the range of 10° to 70° C.

2. A method of forming an inorganic film, said method comprising coating an inorganic film-forming coating composition onto a substrate or impregnating the substrate with the coating composition, followed by drying or heat treating to form an inorganic film, the inorganic film-forming coating composition being prepared by a preparation method, said preparation method comprising adding titanium monomer and/or a low condensation product thereof containing a group hydrolyzed to form hydroxyl group into a mixture of a hydrogen peroxide water with water in such an amount that the titanium monomer and/or the low condensation product thereof may be hydrolyzed, followed by aging and reacting to form a hydroxyl group-containing titanium compound and immediately followed by coordinating the hydroxyl group-containing titanium compound with hydrogen peroxide to form a chelate solution, and containing an inorganic film-forming coating composition comprising the chelate solution, the titanium monomer containing the group hydrolyzed to form hydroxyl group being represented by formula Ti(OR)$_4$, wherein R is same or difference, and represents an alkyl group having 1 to 5 carbon atoms, the low condensation product having a degree of condensation of 2 to 30, a mixing ratio of the titanium monomer and/or the low condensation product thereof containing the group hydrolyzed to form hydroxyl group to the hydrogen peroxide water being such that the hydrogen peroxide water is in the range of 1 to 20 parts by weight as hydrogen peroxide per 10 parts by weight of the titanium monomer and/or the low condensation product thereof, the reaction temperature being in the range of 10° to 70° C.

3. An inorganic film prepared according to a method, said method comprising coating an inorganic film-forming coating composition onto a substrate or impregnating the substrate with the coating composition, followed by drying or heat treating to form an inorganic film, the inorganic film-forming coating composition being prepared by a preparation method, said preparation method comprising addign titanium monomer and/or a low condensation product thereof containign the group hydrolyzed to form hydroxyl group into a mixture of a hydrogen peroxide water with water in such an amount that the titanium monomer and/or the low condensation product thereof may be hydrolyzed, and that a mixing ratio of the titanium monomer and/or the low condensation product thereof containing the group hydrolyzed to form hydroxyl group to the hydrogen peroxide water being such that the hydrogen peroxide water is in the range of 1 to 20 Parts by weight as hydrogen peroxide per 10 parts by weight of the titanium monomer and/or the low condensation production thereof, followed by aging and reacting to form a hydroxyl group-containing titanium compound and immediately followed by coordinating the hydroxyl group-containing titanium compound with hydrogen peroxide to form a chelate solution, and obtaining an inorganic film-forming coating composition comprising the chelate solution, the titanium monomer containing the group hydrolyzed to form hydroxyl group being represented by formula Ti(OR)$_4$, wherein R is same or different, and represent an alkyl group having 1 to 5 carbon atoms, and showing photoactivity, antibacterial properties, hydrophilic properties, pollution resistance, hazeproofness, gas decomposition properties, deodorizing properties, water treatment properties, energy transformation properties, decoloring properties and corrosion resistance.

* * * * *